United States Patent
Yonehara et al.

(10) Patent No.: US 12,460,258 B2
(45) Date of Patent: Nov. 4, 2025

(54) NUCLEIC ACID TESTING DEVICE AND NUCLEIC ACID TESTING METHOD

(71) Applicant: PHC Holdings Corporation, Tokyo (JP)

(72) Inventors: Ryo Yonehara, Saitama (JP); Ayako Michida, Gunma (JP)

(73) Assignee: PHC Holdings Corporation, Tokyo (JP)

( * ) Notice: Subject to any disclaimer, the term of this patent is extended or adjusted under 35 U.S.C. 154(b) by 455 days.

(21) Appl. No.: 17/961,975

(22) Filed: Oct. 7, 2022

(65) Prior Publication Data

US 2023/0023097 A1    Jan. 26, 2023

Related U.S. Application Data

(63) Continuation of application No. PCT/JP2021/009033, filed on Mar. 8, 2021.

(51) Int. Cl.
| | | |
|---|---|---|
| *C12Q 1/6858* | (2018.01) | |
| *B01L 3/00* | (2006.01) | |
| *B01L 7/00* | (2006.01) | |

(52) U.S. Cl.
CPC ...... *C12Q 1/6858* (2013.01); *B01L 3/502715* (2013.01); *B01L 7/52* (2013.01); *B01L 2200/16* (2013.01); *B01L 2300/0654* (2013.01); *B01L 2300/18* (2013.01); *C12Q 2600/156* (2013.01)

(58) Field of Classification Search
CPC ............ C12Q 1/6841; C12Q 2543/101; B01L 2300/18; B01L 3/502715
See application file for complete search history.

(56) References Cited

U.S. PATENT DOCUMENTS

2019/0262831 A1* 8/2019 West .................... C12Q 1/68

FOREIGN PATENT DOCUMENTS

| | | |
|---|---|---|
| JP | 2008-278810 A | 11/2008 |
| JP | 2009-207392 A | 9/2009 |
| WO | 97/32044 A1 | 9/1997 |

OTHER PUBLICATIONS

Peng et al., "Automatic image analysis for gene expression patterns of fly embryos," BMC Cell Biology, vo. 8, suppl. 1, S7, pp. 1-13. (Year: 2007).*
International Search Report issued in corresponding International Patent Application No. PCT/JP2021/009033, dated May 25, 2021 with English translation.
K. Aoyagi, "Application of in situ POR to genetic research and medicine," Gene & Medicine, vol. 2., No. 2 (1998), pp. 282-286, with a partial translation.

* cited by examiner

*Primary Examiner* — Young J Kim
(74) *Attorney, Agent, or Firm* — Rimon P.C.

(57) ABSTRACT

A nucleic acid testing device includes: a stage on which is placed a tissue section to which a solution has been added, in which the solution contains a labeling substance of a target nucleic acid and an amplification reagent for the target nucleic acid; a temperature adjuster that adjusts the temperature of the tissue section on the stage; a temperature controller that controls the temperature adjuster to advance nucleic acid amplification reaction in the tissue section; an intensity detector that detects label intensity in the tissue section over time; and a storage unit that stores detection information generated by the intensity detector.

7 Claims, 7 Drawing Sheets

NUCLEIC ACID TESTING DEVICE AND NUCLEIC ACID TESTING METHOD

CROSS-REFERENCE TO RELATED APPLICATIONS

This application is the continuation of International Patent Application No. PCT/JP2021/009033, filed on Mar. 8, 2021, which claims the benefit of priority from Japanese Patent Application No. 2020-072540, filed on Apr. 14, 2020, the entire content of each of which is incorporated herein by reference.

BACKGROUND

Field of the Invention

The present disclosure relates to a nucleic acid testing device and a nucleic acid testing method.

Description of the Related Art

Recent studies have revealed that diseases such as cancer are caused by accumulated mutations in various genes and that gene mutation patterns are different for each patient. It has also become clear that such mutated genes include those related to the survival of cells mutated by a disease. Therefore, genetic testing is becoming increasingly important for identification of disease types and treatment of diseases. To improve the accuracy of genetic testing, it is effective to amplify the target nucleic acids that encode disease-related genes, using a nucleic acid amplification device. As a conventional nucleic acid amplification device, a real-time PCR device is known to amplify a nucleic acid by polymerase chain reaction (PCR) and detect the amplification of the nucleic acid in real time (see Patent Literature 1, for example).
Patent Literature 1: Japanese Unexamined Patent Application Publication No. 2008-278810

With a conventional real-time PCR device, when extracting a nucleic acid from a tissue, it is necessary to crush and mix the tissue. Therefore, it has been impossible to amplify a nucleic acid while retaining the position information of the nucleic acid. In contrast, an in situ PCR device is known as a device that can acquire position information of nucleic acids. In this device, since a target nucleic acid can be amplified on a tissue section, position information of the target nucleic acid can be acquired. However, with a conventional in situ PCR device, the amplification of a nucleic acid cannot be detected in real time, so that quantitative analysis of the nucleic acid cannot be performed.

Due to the increasing importance of genetic testing, there is a growing demand for acquiring various information regarding the target nucleic acid, such as the expression level and expression position of the target nucleic acid. However, with the conventional nucleic acid testing devices, it has been difficult to meet the demand.

SUMMARY OF THE INVENTION

The present disclosure has been made in view of such a situation, and a purpose thereof is to provide a nucleic acid testing technology with which more information can be acquired.

In response to the above issue, one embodiment of the present disclosure relates to a nucleic acid testing device. The device includes: a stage on which is placed a tissue section to which a solution has been added, in which the solution contains a labeling substance of a target nucleic acid and an amplification reagent for the target nucleic acid; a temperature adjuster that adjusts the temperature of the tissue section on the stage; a temperature controller that controls the temperature adjuster to advance nucleic acid amplification reaction in the tissue section; an intensity detector that detects label intensity in the tissue section over time; and a storage unit that stores detection information generated by the intensity detector.

Another embodiment of the present disclosure relates to a nucleic acid testing method. The method includes: adjusting the temperature of a tissue section to which a solution that contains a labeling substance of a target nucleic acid and an amplification reagent for the target nucleic acid has been added, such as to advance nucleic acid amplification reaction in the tissue section; detecting label intensity in the tissue section over time; and storing detected information.

Optional combinations of the aforementioned constituting elements, and implementation of the present disclosure, including the expressions, in the form of methods, apparatuses, or systems may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

In the following, the present disclosure will be described based on a preferred embodiment with reference to the drawings. The embodiment is intended to be illustrative only and not to limit the present disclosure, so that it should be understood that not all of the features or combinations thereof described in the embodiment are necessarily essential to the present disclosure. Like reference characters denote like or corresponding constituting elements, members, and processes in each drawing, and repetitive description will be omitted as appropriate.

The scale or shape of each component shown in each drawing is defined for the sake of convenience to facilitate the explanation and is not to be regarded as limitative unless otherwise specified. Also, when the terms "first", "second", and the like are used in the present specification or claims, such terms do not imply any order or degree of importance and are used to distinguish one configuration from another, unless otherwise specified. Further, in each drawing, part of members less important in describing the embodiment may be omitted.

Figure 1:
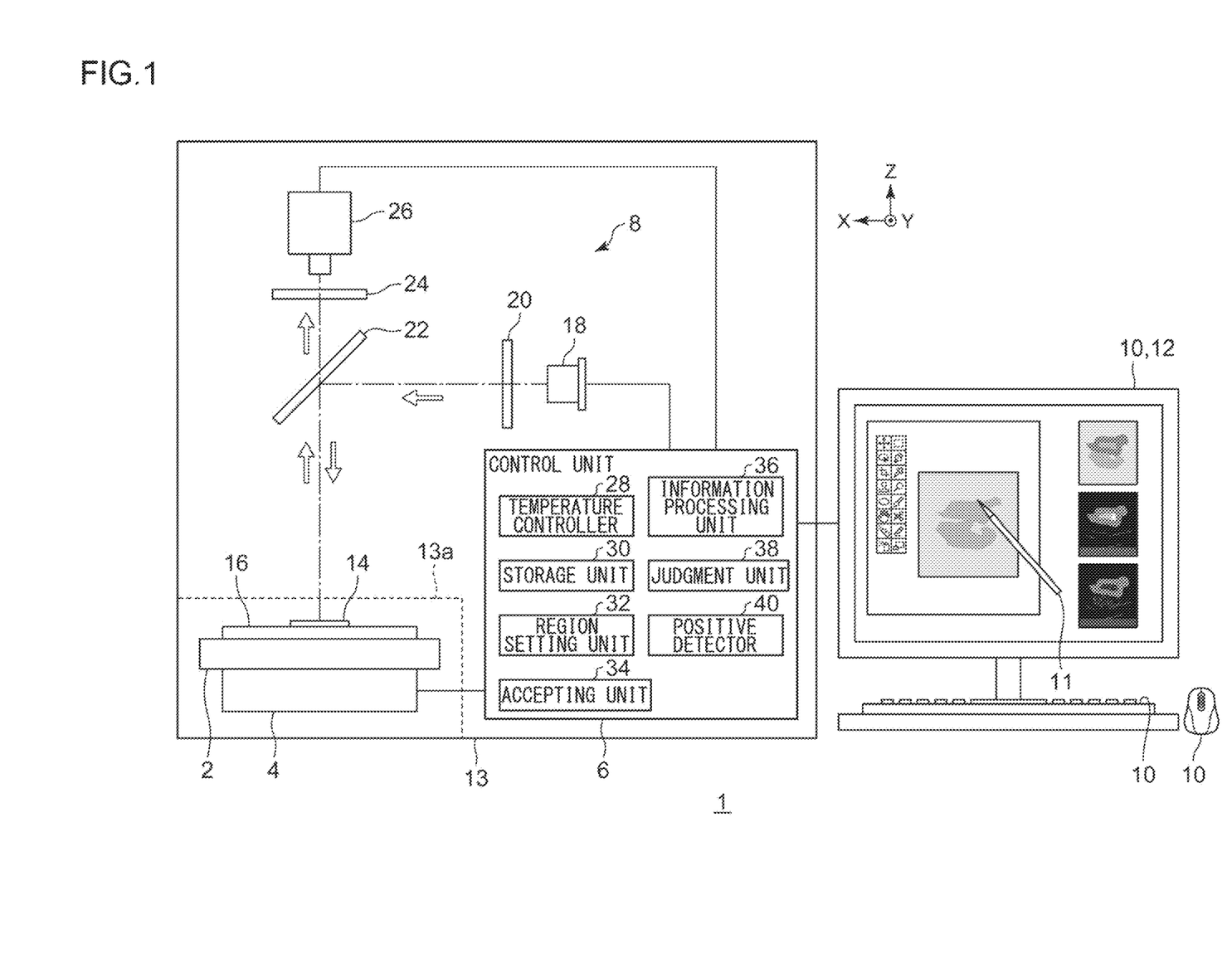
FIG. 1 is a front view that schematically illustrates a nucleic acid testing device according to an embodiment.
Figure 2:
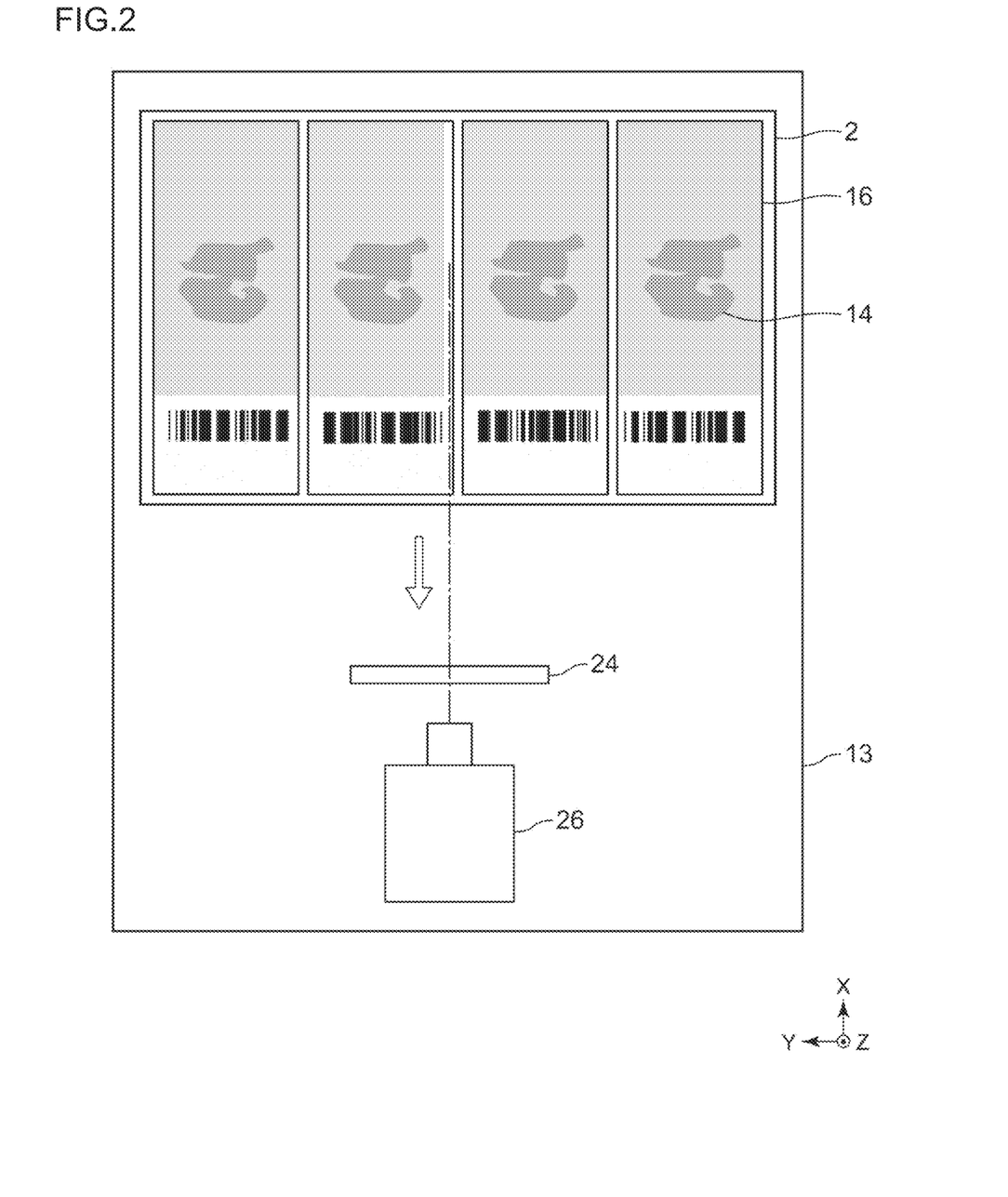
FIG. 2 is a plan view that schematically illustrates a stage on which a tissue section is placed.

FIG. 1 is a front view that schematically illustrates a nucleic acid testing device according to an embodiment. FIG. 2 is a plan view that schematically illustrates a stage on which a tissue section is placed. A nucleic acid testing device 1 according to the present embodiment includes a stage 2, a temperature adjuster 4, a control unit 6, an intensity detector 8, an input unit 10, and a display unit 12. The stage 2, the temperature adjuster 4, the control unit 6, and the intensity detector 8 are housed in a casing 13. The input unit 10 and the display unit 12 are arranged outside the casing 13. The control unit 6 may also be disposed outside the casing 13. In this case, all the constituting elements of the control unit 6 may be located outside the casing 13, or some of the constituting elements may be located outside the casing 13. Also, the input unit 10 and the display unit 12 may be located in the casing 13.

The stage 2 has a planar shape, and a tissue section 14 is placed thereon. The tissue section 14 is supported by a glass slide 16, for example, and placed on the stage 2. As an example, the casing 13 includes a slide portion 13a in which the stage 2 is provided. The slide portion 13a can be moved in and out of the casing 13 and, by withdrawing the slide portion 13a, the tissue section 14 can be placed on the stage 2.

To the tissue section 14, a solution is added that contains a labeling substance for labeling a target nucleic acid and also contains an amplification reagent for amplifying the target nucleic acid. The labeling substance may be a fluorescent substance, such as a fluorescent label probe or DNA intercalator, for example. The amplification reagents include primers specific for labeled nucleic acids, DNA polymerase, and dNTPs.

The temperature adjuster 4 adjusts the temperature of the tissue section 14 on the stage 2. The temperature adjuster 4 includes a thermoelectric plate, a heat dissipation unit, and the like. The thermoelectric plate adjusts the temperature of the tissue section 14 by heating and cooling the stage 2. The thermoelectric plate includes a thermoelectric element and a temperature sensor. The thermoelectric element may be a Peltier element, for example. The temperature sensor may be a thermistor, for example. The thermoelectric plate is mounted on a substrate. The substrate includes external connection terminals to which the control unit 6 and a power supply are connected.

The temperature adjuster 4 is controlled by the control unit 6. In specific, a control signal is transmitted from the control unit 6 to the thermoelectric element via the substrate. Based on the instructions from the control unit 6, the thermoelectric element heats and cools the stage 2. The temperature sensor detects the temperature of the stage 2 and outputs the detection result to the control unit 6 via the substrate. Based on the output value from the temperature sensor, the control unit 6 controls the thermoelectric element. The heat dissipation unit may be constituted by a heat sink including multiple heat dissipation fins, for example, and dissipates heat of the thermoelectric plate.

The control unit 6 controls the temperature adjuster 4 to advance nucleic acid amplification reaction in the tissue section 14. The control unit 6 also controls the operation of each unit other than the temperature adjuster 4. The control unit 6 may be implemented by an element such as a CPU or memory of a computer or by a circuit as a hardware configuration, and by a computer program or the like as a software configuration. FIG. 1 illustrates functional blocks implemented by cooperation of such components. It will be naturally understood by those skilled in the art that the functional blocks may be implemented in a variety of forms by combinations of hardware and software. The operation of each unit of the control unit 6 will be detailed later.

The intensity detector 8 is a mechanism for detecting the label intensity in the tissue section 14 over time using a measurement method appropriate for the type of the labeling substance. In the present embodiment, a fluorescent substance is used as an example of the labeling substance. Therefore, the intensity detector 8 includes a light source 18, a first optical filter 20, a dichroic mirror 22, a second optical filter 24, and a camera 26.

The light source 18 is, for example, a halogen lamp or a semiconductor laser light source, which emits light including excitation light. Turning on and off of the light source 18 is controlled by the control unit 6. The light source 18 of the present embodiment is disposed such that the optical axis extends parallel to the stage 2. The first optical filter 20 is a bandpass filter that transmits the excitation light, which excites the labeling substance, in the light emitted from the light source 18. The first optical filter 20 is disposed on the optical axis of the light source 18.

The dichroic mirror 22 is also disposed on the optical axis of the light source 18 and reflects the excitation light, which has penetrated the first optical filter 20, toward the tissue section 14. The excitation light reflected by the dichroic mirror 22 is provided to the tissue section 14. When the excitation light is provided to the tissue section 14, the labeling substance is excited to emit fluorescence. The fluorescence penetrates the dichroic mirror 22 and travels toward the second optical filter 24. The second optical filter 24 is a bandpass filter that selectively transmits the fluorescence that has penetrated the dichroic mirror 22. The fluorescence that has penetrated the second optical filter 24 is then incident on the camera 26. The camera 26 receives the fluorescence to repeatedly generate fluorescence images and transmits the images thus generated to the control unit 6. The fluorescence images correspond to detection information regarding the label intensity in the tissue section 14.

The intensity detector 8 irradiates the tissue section 14 with multiple different wavelengths of excitation light to allow the tissue section 14 to emit multiple different wavelengths of fluorescence, so that fluorescence images corresponding to the respective wavelengths of fluorescence can be generated. For example, a filter unit constituted by the first optical filter 20, the dichroic mirror 22, and the second optical filter 24 may be prepared for each wavelength of fluorescence, and, by sequentially switching the filter unit through which excitation light passes, the fluorescence images corresponding to the respective wavelengths of fluorescence are generated by the camera 26. The intensity detector 8 may be equipped with a single light source 18 capable of emitting multiple different wavelengths of excitation light or may be equipped with multiple light sources 18 that emit the respective wavelengths of excitation light.

Also, by irradiating the tissue section 14 with visible light and capturing the reflected light using the camera 26, a bright field image corresponding to the light can be generated. The camera 26 also transmits the bright field image thus generated to the control unit 6.

The arrangement of the components constituting the intensity detector 8 is not particularly limited. For example, the light source 18 may be disposed such that the optical axis intersects the stage 2, and the camera 26 may be disposed such that the optical axis extends parallel to the stage 2. In this case, the light from the light source 18 penetrates the first optical filter 20 and then penetrates the dichroic mirror 22, so as to be provided to the tissue section 14. The fluorescence generated in the tissue section 14 is reflected by the dichroic mirror 22 toward the second optical filter 24, so as to penetrate the second optical filter 24 to be incident on the camera 26.

The input unit 10 may be constituted by a mouse, a keyboard, or the like. Also, the display unit 12 may be constituted by a display or the like. The nucleic acid testing device 1 of the present embodiment includes the input unit 10 and the display unit 12 integrally configured by a touch panel display. A user can input an instruction to the display as the input unit 10 using a stylus pen 11 or the like. Although the input unit 10 and the display unit 12 are illustrated separately from the casing 13 in FIG. 1, these units may be incorporated into the casing 13 as described previously. A user of the nucleic acid testing device 1 can instruct, through the input unit 10, the control unit 6 to perform various operations. Also, the display unit 12 can display various kinds of information based on the instructions from the control unit 6.

The control unit 6 includes a temperature controller 28, a storage unit 30, a region setting unit 32, an accepting unit 34, an information processing unit 36, a judgment unit 38, and a positive detector 40. The temperature controller 28 controls the temperature adjuster 4 to advance the nucleic acid amplification reaction in the tissue section 14. The nucleic acid amplification method performed by the temperature controller 28 is not particularly limited and may be a variable temperature nucleic acid amplification method, such as polymerase chain reaction (PCR), or an isothermal nucleic acid amplification method, such as recombinase polymerase amplification (RPA) or loop-mediated isothermal amplification (LAMP), for example.

The storage unit 30 is constituted by a RAM, a ROM, a hard disk, or the like. The storage unit 30 stores detection information generated by the intensity detector 8. The storage unit 30 of the present embodiment stores, as the detection information from the intensity detector 8, fluorescence images and bright field images generated by the camera 26. These images are generated over time during the progress of the nucleic acid amplification reaction and stored in the storage unit 30. This enables detection of the location of the target nucleic acid and also enables real-time detection of the amplification of the target nucleic acid.

Figure 3:
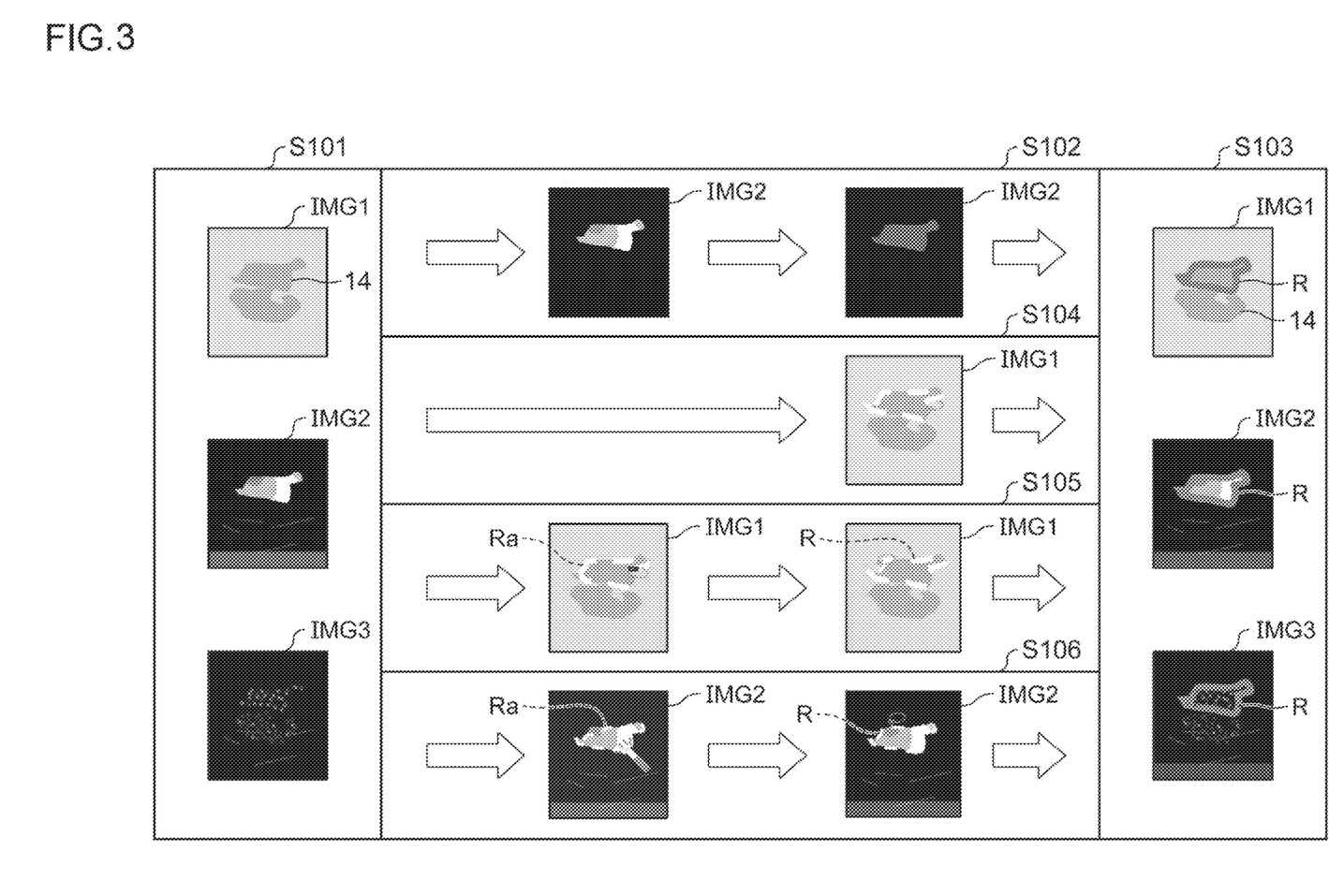
FIG. 3 is a schematic diagram used to describe a procedure for determining a test region.

The region setting unit 32 determines a test region R in the tissue section 14 based on at least one of the shape of the tissue section 14 or label intensity in the tissue section 14. The test region R may also be arbitrarily defined by a user. When a user specifies a test region via the input unit 10, the accepting unit 34 accepts the specification. FIG. 3 is a schematic diagram used to describe a procedure for determining a test region.

Upon completion of the nucleic acid amplification reaction, various images are displayed on the display unit 12 (S101). As an example, a bright field image IMG1, a first fluorescence image IMG2, and a second fluorescence image IMG3 are displayed on the display unit 12. The first fluorescence image IMG2 is a fluorescence image corresponding to fluorescence emitted by a labeling substance. The second fluorescence image IMG3 is a fluorescence image corresponding to fluorescence emitted by two kinds of labeling substances that are different from the labeling substance of the first fluorescence image IMG2.

When the region setting unit 32 determines the test region R, the region setting unit 32 applies, for example, publicly-known image processing to the first fluorescence image IMG2 and extracts a fluorescence region with predetermined fluorescence intensity or greater (S102). In the example shown in FIG. 3, background noise in the first fluorescence image IMG2 is reduced by publicly-known filtering or the like (the left image in the step S102), and, subsequently, binarization of luminance using a predetermined threshold is performed, for example, to extract a fluorescence region (the right image in the step S102). The "threshold" can be set as appropriate based on experiments and simulations conducted by the designer and may be set in advance by a user via the input unit 10. Thereafter, the region setting unit 32 defines the extracted fluorescence region as the test region R in each of the bright field image IMG1 through the second fluorescence image IMG3 (S103).

The region setting unit 32 may also determine the test region R based on the shape of the tissue section 14. For example, the region setting unit 32 may apply publicly-known range selection processing to the bright field image IMG1 or the like to select a range based on the contrast of the image and the like, thereby determining the test region R.

When a user determines the test region R, the user applies, for example, publicly-known range selection processing to the bright field image IMG1 via the input unit 10 (S104). In the example shown in FIG. 3, range selection processing is performed on the bright field image IMG1 using a range selection tool employed in publicly-known image processing software or the like. As a result, the test region R is determined in each of the bright field image IMG1 through the second fluorescence image IMG3 (S103). The user can also determine the test region R by applying publicly-known range selection processing to a fluorescence image.

Also, the setting of the test region R by the region setting unit 32 and the setting of the test region R by the user may be combined. For example, each of the region setting unit 32 and the user applies range selection processing based on the shape of the tissue section 14 on the bright field image IMG1 (S105). In the example shown in FIG. 3, the region setting unit 32 applies publicly-known range selection processing to the bright field image IMG1 to determine a provisional region Ra (the left image in the step S105), and, subsequently, the user applies publicly-known range selection processing for fine adjustment of the provisional region Ra to determine the test region R (the right image in the step S105).

Also, each of the region setting unit 32 and the user may apply, for example, range selection processing based on the fluorescence intensity on the first fluorescence image IMG2 (S106). In the example shown in FIG. 3, the region setting unit 32 applies publicly-known range selection processing to the first fluorescence image IMG2 to determine a provisional region Ra (the left image in the step S106), and, subsequently, the user applies publicly-known range selection processing for fine adjustment of the provisional region Ra to determine the test region R (the right image in the step S106). The publicly-known range selection processing used for setting of the test region R as described above includes the so-called magnet selection tool, lasso selection tool, polygon selection tool, and automatic selection tool, used in publicly-known image processing software.

The region setting unit 32 transmits information regarding the test region R to the information processing unit 36. Upon acquisition of the information regarding the test region R, the information processing unit 36 generates information regarding the target nucleic acid in the test region R. The type of the target nucleic acid information generated by the information processing unit 36 may be specified by the user via the input unit 10. Also, predetermined target nucleic acid information may be automatically generated by the information processing unit 36.

Figure 4A:
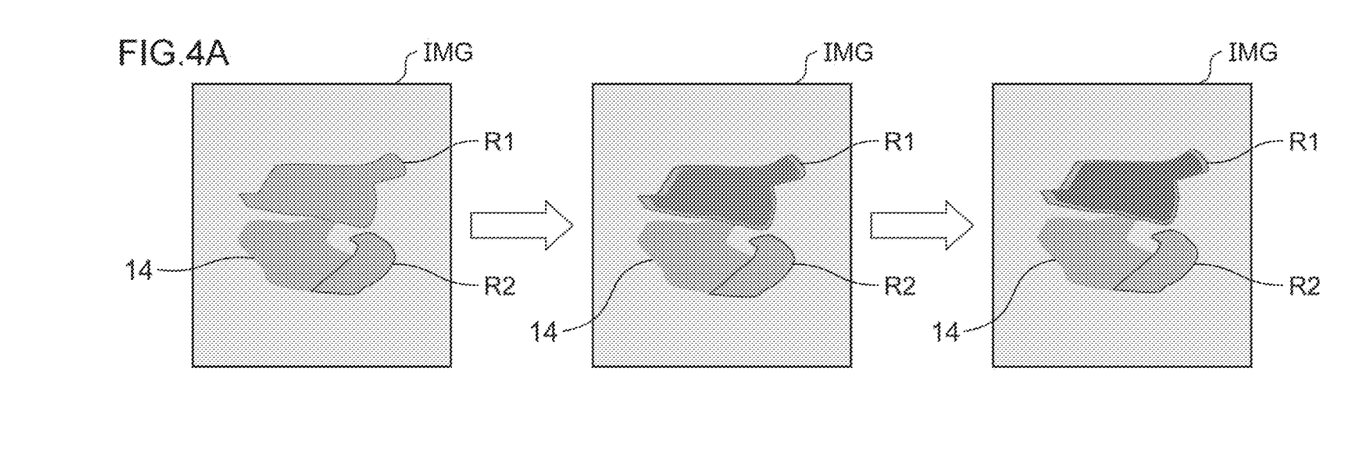
FIGS. 4A and 4B are diagrams used to describe processing for quantifying a target nucleic acid.

For example, the information processing unit 36 generates information regarding the amount of the target nucleic acid, as the target nucleic acid information. FIGS. 4A and 4B are diagrams used to describe processing for quantifying the target nucleic acid. As shown in FIG. 4A, the images IMG generated by the intensity detector 8 are accumulated over time in the storage unit 30. As an example, FIG. 4A illustrates composite images of the bright field images IMG1 and the first fluorescence images IMG2. Also, FIG. 4A illustrates only three images IMG, for the sake of convenience. The left side is an image IMG before the start of the nucleic acid amplification reaction, the right side is an image IMG after the completion of the nucleic acid amplification reaction, and the middle is one of images IMG obtained during the progress of the nucleic acid amplification reaction.

In the image IMG obtained after the completion of the nucleic acid amplification reaction, a first test region R1 and a second test region R2 are set by the aforementioned process of setting the test region R. The first test region R1 is a fluorescence region, i.e., a positive region, corresponding to a predetermined labeling substance. The second test region R2 is a non-fluorescence region, i.e., a negative region, in which the fluorescence intensity corresponding to the labeling substance is less than a threshold. In the images IMG accumulated over time, the fluorescence intensity in the first test region R1 gradually increases as the nucleic acid amplification reaction proceeds.

Figure 4B:
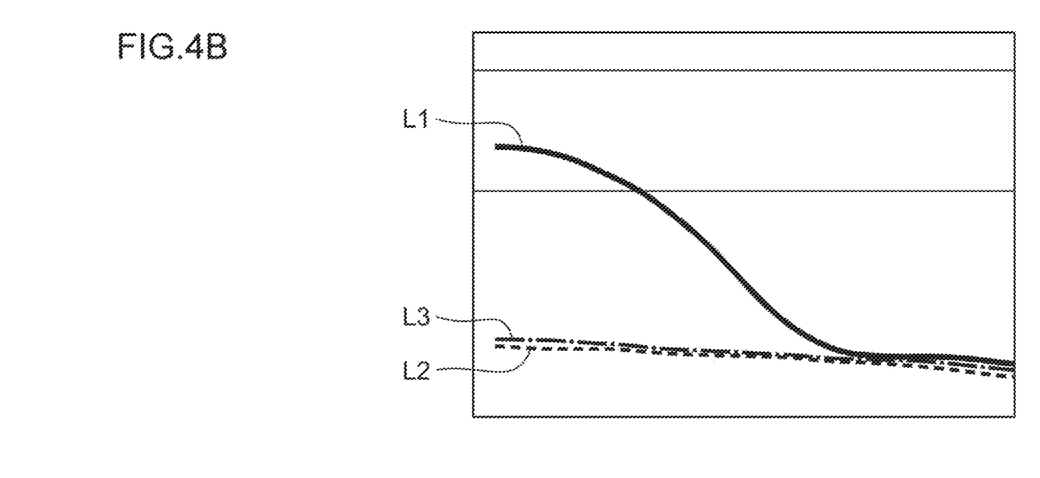

The information processing unit 36 derives a change over time of the label intensity in the test region R as shown in FIG. 4B and calculates the amount of the target nucleic acid in the first test region R1 based on the change over time. For example, the information processing unit 36 calculates and plots average luminance values of the first test region R1 and the second test region R2 in each image IMG to obtain amplification curves. For example, the information processing unit 36 generates amplification curves by plotting average luminance values retroactively from the end to the start of the nucleic acid amplification reaction. In FIG. 4B, an amplification curve L1 corresponds to the first test region R1, an amplification curve L2 corresponds to the second test region R2, and an amplification curve L3 corresponds to the negative control. The information processing unit 36 uses the amplification curve L1 thus obtained to quantify the target nucleic acid by a publicly-known method. The information processing unit 36 then displays, on the display unit 12, the generated information regarding the amount of the target nucleic acid.

Figure 5:
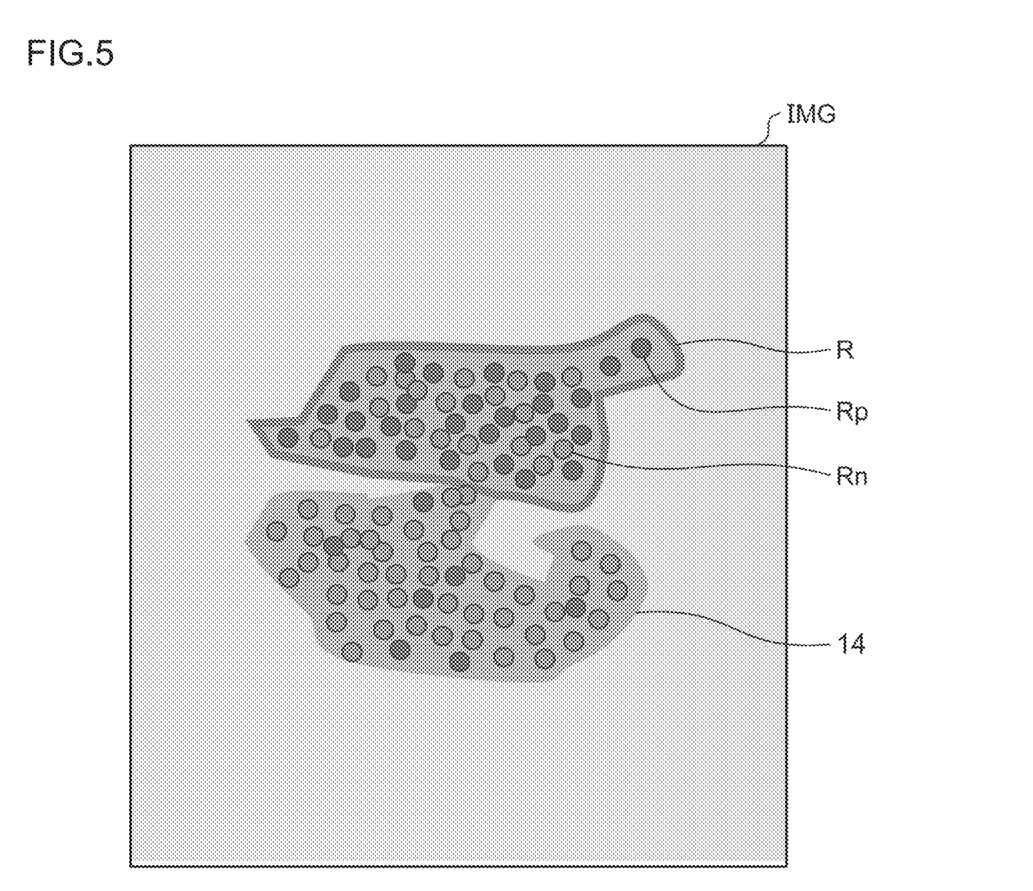
FIG. 5 is a diagram used to describe processing for judging the state of a specimen.

The information processing unit 36 also generates information regarding the state of a specimen, as the target nucleic acid information. FIG. 5 is a diagram used to describe processing for judging the state of a specimen. As an example, FIG. 5 illustrates an image IMG of a composite image of the bright field image IMG1 and the second fluorescence image IMG3. Also, the image IMG illustrated in FIG. 5 is an image IMG obtained after the completion of the nucleic acid amplification reaction.

In the image IMG obtained after the completion of the nucleic acid amplification reaction, the test region R is set by the aforementioned process of setting the test region R. The information processing unit 36 calculates a ratio between a positive region Rp and a negative region Rn in the test region R. The positive region Rp is a region in which the label intensity related to a predetermined labeling substance is greater than or equal to a predetermined threshold. The negative region Rn is a region in which the label intensity related to the same labeling substance is less than the threshold. The "threshold" can be set as appropriate based on experiments and simulations conducted by the designer and may be set in advance by a user via the input unit 10. The calculation of the ratio includes calculating the ratio of the area of the positive region Rp to the total area of the test region R. The "area" may be the number of pixels in an image IMG, for example.

Also, in the present embodiment, the negative region Rn is identified based on the label intensity related to a labeling substance that labels normal cells. In specific, the target nucleic acid is included in an abnormal cell that is in a predetermined abnormal state. Also, the labeling substance includes a first labeling substance that labels abnormal cells and a second labeling substance that labels normal cells. In other words, the first labeling substance labels a nucleic acid (target nucleic acid) specific to abnormal cells. On the other hand, the second labeling substance labels a nucleic acid specific to normal cells. The information processing unit 36 identifies, in the test region R, the positive region Rp based on the label intensity related to the first labeling substance and also identifies the negative region Rn based on the label intensity related to the second labeling substance. Therefore, the ratio between the positive region Rp and the negative region Rn corresponds to the ratio between abnormal cells and normal cells. Also, the ratio may be the area ratio or the ratio of the number of cells between normal cells and abnormal cells. Further, the calculation of the ratio also includes calculating the ratio of abnormal cells to all the cells.

The information processing unit 36 transmits, to the judgment unit 38, ratio information as the information regarding the state of a specimen. When the target nucleic acid is a nucleic acid associated with a certain disease, the judgment unit 38 can judge the severity of the disease based on the ratio. For example, the judgment unit 38 may retain in advance a conversion table that relates the ratio to the severity of a disease, so as to determine the severity using the conversion table. The conversion table can be set as appropriate based on experiments and simulations conducted by the designer. The judgment unit 38 displays the results of severity judgment on the display unit 12. Therefore, the user of the nucleic acid testing device 1 can objectively grasp the severity of the disease.

The judgment unit 38 may also perform judgment regarding a state other than the severity of a disease. Also, the information processing unit 36 may display the ratio information itself on the display unit 12. In this case, when the target nucleic acid is a nucleic acid associated with a disease, the user can estimate the severity of the disease from the ratio. Also, when the target nucleic acid is a nucleic acid associated with a state other than a disease, the user can estimate the degree of progress or the like of the state from the ratio.

Figure 6A:
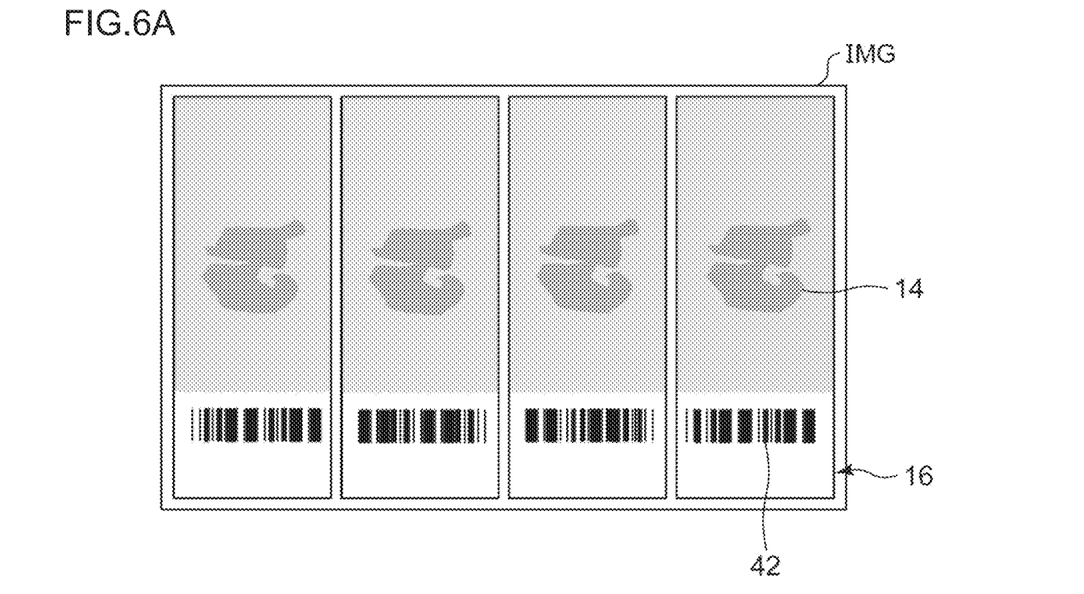
FIGS. 6A and 6B are schematic diagrams used to describe notification processing.
Figure 6B:
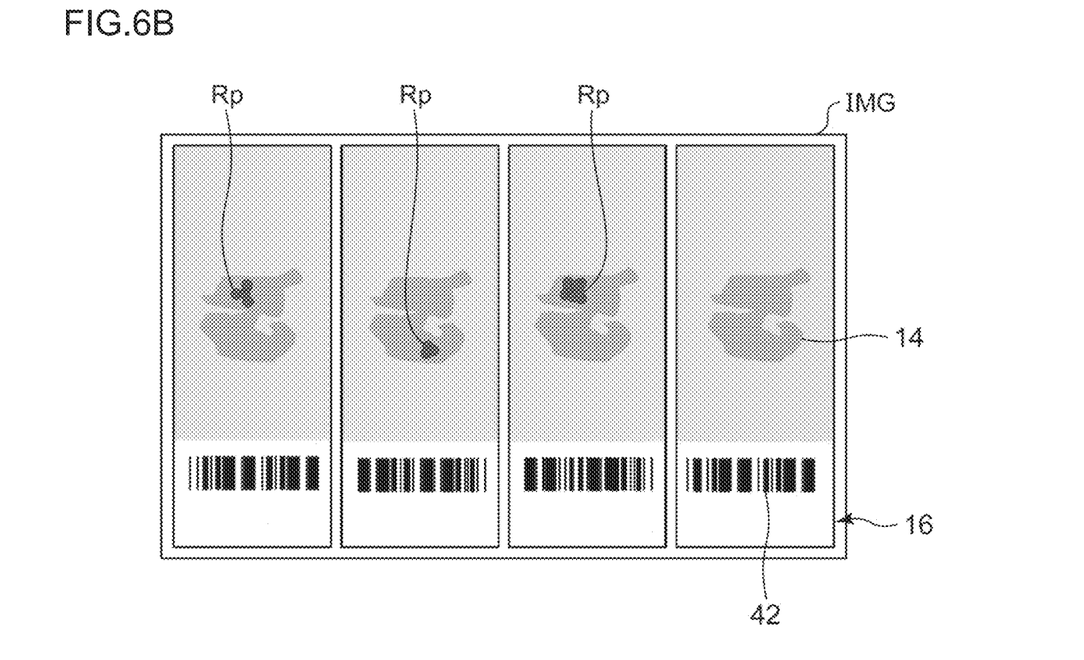

The positive detector 40 performs notification processing for immediately providing notification of the occurrence of the target nucleic acid. FIGS. 6A and 6B are schematic diagrams used to describe notification processing. As an example, FIGS. 6A and 6B illustrate composite images of the bright field images IMG1 and the first fluorescence images IMG2. The image IMG shown in FIG. 6A is an image IMG obtained before the start of the nucleic acid amplification reaction. Also, the image IMG shown in FIG. 6B is an image IMG obtained during the nucleic acid amplification reaction.

The positive detector 40 performs processing for detection of the positive region Rp sequentially on the images IMG generated by the intensity detector 8 during the progress of the nucleic acid amplification reaction, so as to detect the occurrence of the positive region Rp. The positive region Rp is a region with a predetermined area in which the label intensity exceeds a predetermined threshold in the tissue section 14. The "threshold" and "predetermined area" can be set as appropriate based on experiments and simulations conducted by the designer and may be set in advance by a user via the input unit 10. For example, when the positive detector 40 has detected a region of a predetermined number of consecutive pixels in which average luminance exceeds a threshold in an image IMG, the positive detector 40 judges that the positive region Rp has occurred.

Upon detection of the occurrence of the positive region Rp, the positive detector 40 transmits a notification instruction signal to the display unit 12. In the image IMG shown in each of FIGS. 6A and 6B, from left to right, the tissue section 14 in a first specimen, the tissue section 14 in a second specimen, the tissue section 14 in the positive control, and the tissue section 14 in the negative control are arranged. As shown in FIG. 6B, in each of the first specimen, the second specimen, and the positive control, the positive region Rp has occurred during the nucleic acid amplification reaction. At the timing, the positive detector 40 transmits the notification instruction signal to the display unit 12. Upon reception of the notification instruction signal, the display unit 12 emits sound or light, for example. This can notify the user of the nucleic acid testing device 1 of the occurrence of the positive region Rp during the progress of the nucleic acid amplification reaction, i.e., before the completion of the nucleic acid amplification reaction. Therefore, the user can find out the site of the lesion and the like at an earlier stage.

In the tissue section 14 of the first specimen, the positive region Rp has occurred at the same position as in the positive control. Meanwhile, in the tissue section 14 of the second specimen, the positive region Rp has occurred at a position different from that in the positive control. Therefore, a lesion present at an unexpected position can be found at an early stage. On a frosted portion of each glass slide 16, a two-dimensional code 42 of the corresponding tissue section 14 is printed. Based on the two-dimensional codes 42, the control unit 6 can link the images IMG of tissue sections 14 stored in the storage unit 30 to each other.

Figure 7:
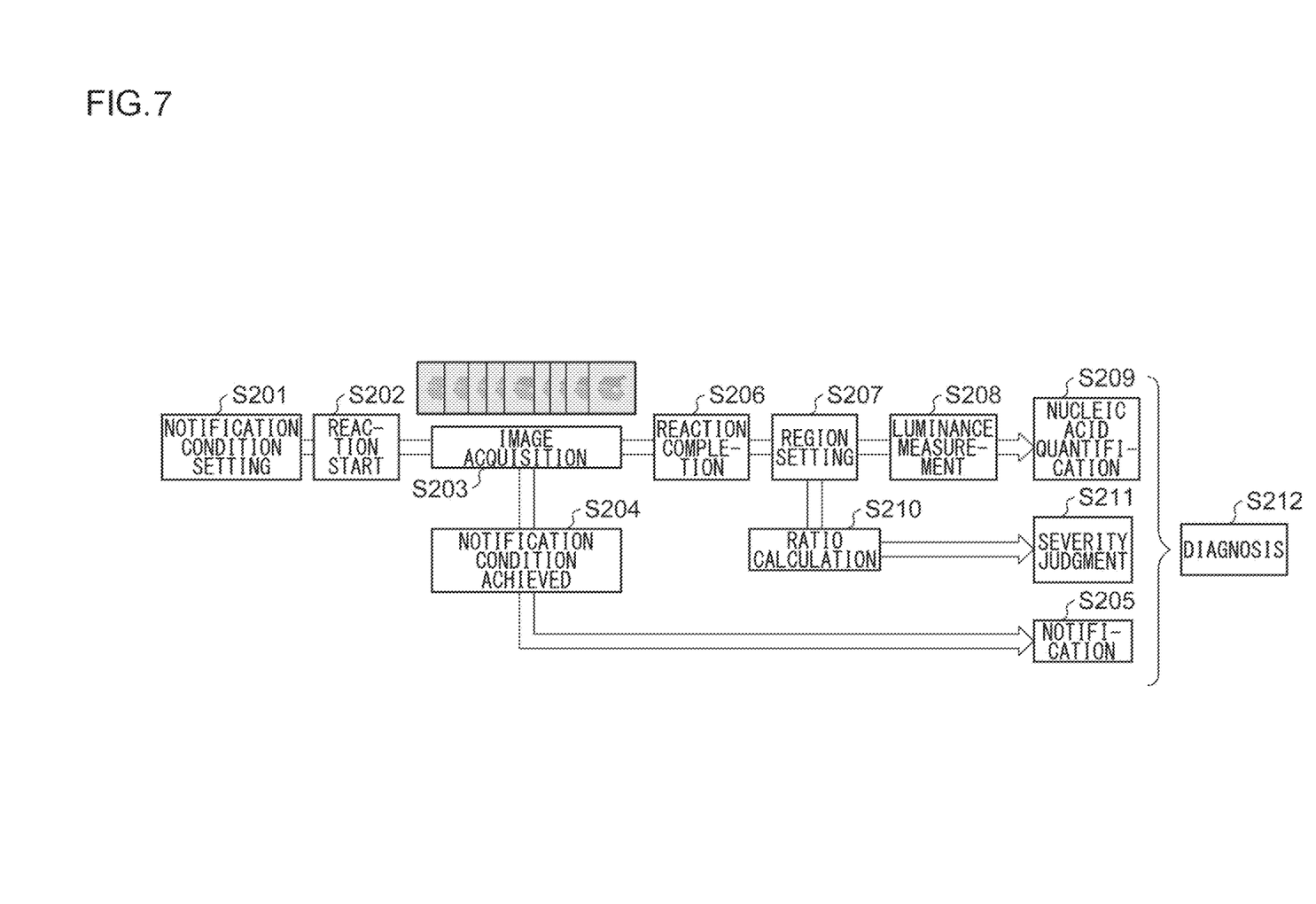
FIG. 7 is a schematic diagram used to describe flow of control performed by the nucleic acid testing device according to the embodiment.

FIG. 7 is a schematic diagram used to describe flow of control performed by the nucleic acid testing device 1 according to the embodiment. First, a notification condition is set by a user via the input unit 10 (S201). Thereafter, the nucleic acid amplification reaction is started (S202). During the nucleic acid amplification reaction, the intensity detector 8 repeatedly generates images of the tissue section 14 (S203). When the positive detector 40 detects the notification condition having been achieved during the nucleic acid amplification reaction (S204), the display unit 12 notifies the user by emitting sound, light, and the like (S205).

When the nucleic acid amplification reaction is completed (S206), the test region R is set, by the region setting unit 32 or the user's input through the input unit 10, in an image IMG obtained after the completion of the nucleic acid amplification reaction (S207). When the test region R is set, the information processing unit 36 measures the luminance of the test region R in each image IMG (S208). Thereafter, an amplification curve is created based on the measured luminance values, and the target nucleic acid is quantified (S209).

When the test region R is set, the information processing unit 36 also calculates the ratio between the positive region Rp and the negative region Rn in the test region R (S210). Thereafter, based on the ratio thus calculated, the judgment unit 38 judges the severity of a disease (S211). The amount of the target nucleic acid obtained in the step S209, the severity obtained in the step S211, and the notification performed in the step S205 can be used for diagnosis of the disease (S212).

As described above, the nucleic acid testing device 1 according to the present embodiment includes: the stage 2 on which is placed a tissue section 14 to which a solution has been added, in which the solution contains a labeling substance of a target nucleic acid and an amplification reagent for the target nucleic acid; the temperature adjuster 4 that adjusts the temperature of the tissue section 14 on the stage 2; the temperature controller 28 that controls the temperature adjuster 4 to advance nucleic acid amplification reaction in the tissue section 14; the intensity detector 8 that detects label intensity in the tissue section 14 over time; and the storage unit 30 that stores detection information generated by the intensity detector 8. Accordingly, the amplification of a nucleic acid can be detected in real time while position information of the nucleic acid can be retained. Therefore, more information can be acquired in the nucleic acid test.

Also, the nucleic acid testing device 1 according to the present embodiment includes: the region setting unit 32 that determines a test region R in the tissue section 14 based on at least one of the shape of the tissue section 14 or label intensity in the tissue section 14; and the information processing unit 36 that generates information regarding the target nucleic acid in the test region R. Also, the nucleic acid testing device 1 includes: the accepting unit 34 that accepts specification, from a user, of the test region R in the tissue section 14; and the information processing unit 36 that generates information regarding the target nucleic acid in the test region R.

The information processing unit 36 of the present embodiment derives a change over time of label intensity in the test region R and calculates the amount of a target nucleic acid in the test region R based on the change over time. The information processing unit 36 also calculates a ratio between the positive region Rp, in which label intensity is greater than or equal to a predetermined threshold, and the negative region Rn, in which label intensity is less than the threshold, in the test region R. Also, the target nucleic acid is included in a cell in a predetermined abnormal state, and the labeling substance includes the first labeling substance that labels predetermined abnormal cells and the second labeling substance that labels normal cells. The information processing unit 36 identifies the positive region Rp based on the label intensity related to the first labeling substance and also identifies the negative region Rn based on the label intensity related to the second labeling substance. Also, the target nucleic acid is a nucleic acid associated with a predetermined disease, and the nucleic acid testing device 1 further includes the judgment unit 38 that judges severity of the disease based on the ratio.

The nucleic acid testing device 1 further includes the positive detector 40 that detects occurrence of a region with a predetermined area in which the label intensity exceeds a predetermined threshold during the progress of the nucleic acid amplification reaction. Also, the nucleic acid testing device 1 further includes the display unit 12 that displays information generated by the information processing unit 36.

With the configuration set forth above, the expression position and expression level of the target nucleic acid can be acquired. Also, the severity of a disease can be grasped. Further, whether or not the target nucleic acid is present can be found before the completion of the nucleic acid amplification reaction. Thus, there can be provided a nucleic acid testing technology with which more information can be acquired.

An embodiment of the present disclosure has been described in detail. The abovementioned embodiment merely describes a specific example for carrying out the present disclosure. The embodiment is not intended to limit the technical scope of the present disclosure, and various design modifications, including changes, addition, and deletion of constituting elements, may be made to the embodiment without departing from the scope of ideas of the invention defined in the claims. Such an additional embodiment with a design modification added has the effect of each of the combined embodiment and modifications. In the aforementioned embodiment, matters to which design modifications may be made are emphasized with the expression of "of the present embodiment", "in the present embodiment", or the like. However, design modifications may also be made to matters without such expression. Optional combinations of the abovementioned constituting elements may also be employed as additional modes of the present disclosure. Also, the hatching provided on the cross sections in the drawings does not limit the materials of the objects with the hatching.

The embodiment may be defined by the following item.

[Item 1]

A nucleic acid testing method, including:

adjusting the temperature of a tissue section (14) to which a solution that contains a labeling substance of a target nucleic acid and an amplification reagent for the target nucleic acid has been added, such as to advance nucleic acid amplification reaction in the tissue section (14);

detecting label intensity in the tissue section (14) over time; and storing detected information.

What is claimed is:

1. A nucleic acid testing device, comprising:

a stage on which is placed a tissue section to which a solution has been added, the solution containing a labeling substance of a target nucleic acid and an amplification reagent for the target nucleic acid;

a temperature adjuster that adjusts the temperature of the tissue section on the stage;

a temperature controller that controls the temperature adjuster to advance nucleic acid amplification reaction in the tissue section;

an intensity detector that detects label intensity in the tissue section over time;

a storage unit that stores detection information generated by the intensity detector;

at least one of a region setting unit that determines a test region in the tissue section on the detection information based on at least one of a shape of the tissue section or label intensity in the tissue section, or an accepting unit that accepts specification, from a user, of a test region in the tissue section on the detection information; and an information processing unit that derives a change over time of the label intensity in the test region and generates information regarding the target nucleic acid in the test region based on the change over time of the label intensity in the test region, wherein the information processing unit is configured to calculate a ratio between a positive region, in which label intensity is greater than or equal to a predetermined threshold, and a negative region, in which label intensity is less than the threshold, in the test region.

2. The nucleic acid testing device according to claim 1, wherein the information processing unit derives a change over time of label intensity in the test region and calculates an amount of a target nucleic acid in the test region based on the change over time.

3. The nucleic acid testing device according to claim 1, wherein the target nucleic acid is included in a cell in a predetermined abnormal state, the labeling substance includes a first labeling substance that labels an abnormal cell and a second labeling substance that labels a normal cell, and the information processing unit identifies the positive region based on label intensity related to the first labeling substance and also identifies the negative region based on label intensity related to the second labeling substance.

4. The nucleic acid testing device according to claim 1, wherein the target nucleic acid is a nucleic acid associated with a predetermined disease, the nucleic acid testing device further comprising a judgment unit that judges severity of the disease based on the ratio.

5. The nucleic acid testing device according to claim 1, further comprising a positive detector that detects occurrence of a region with a predetermined area in which the label intensity exceeds a predetermined threshold during the progress of the nucleic acid amplification reaction.

6. The nucleic acid testing device according to claim 1, further comprising a display unit that displays information generated by the information processing unit.

7. A nucleic acid testing method, comprising:

adjusting a temperature of a tissue section to which a solution that contains a labeling substance of a target nucleic acid and an amplification reagent for the target nucleic acid has been added, such as to advance nucleic acid amplification reaction in the tissue section;

detecting label intensity in the tissue section over time;

storing detected information;

at least one of determining a test region in the tissue section on the detected information based on at least one of a shape of the tissue section or label intensity in the tissue section, or accepting specification, from a user, of a test region in the tissue section on the detected information;

deriving a change over time of the label intensity in the test region;

generating information regarding the target nucleic acid in the test region based on the change over time of the label intensity in the test region; and calculating a ratio between a positive region, in which label intensity is greater than or equal to a predetermined threshold, and a negative region, in which label intensity is less than the threshold, in the test region.

* * * * *